July 2, 1946.   D. R. RANKIN   2,403,397
LUBRICATION SYSTEM
Filed Oct. 19, 1942   2 Sheets-Sheet 1

INVENTOR:
DAN R. RANKIN
BY
ATTORNEY

July 2, 1946.  D. R. RANKIN  2,403,397
LUBRICATION SYSTEM
Filed Oct. 19, 1942  2 Sheets-Sheet 2

INVENTOR:
DAN R. RANKIN
BY
ATTORNEY

Patented July 2, 1946

2,403,397

UNITED STATES PATENT OFFICE 2,403,397

LUBRICATION SYSTEM

Dan R. Rankin, Los Angeles, Calif., assignor to Food Machinery Corporation, San Jose, Calif., a corporation of Delaware Application October 19, 1942, Serial No. 462,485

7 Claims. (Cl. 308—93)

This invention relates to the lubrication art and particularly to pressure lubrication systems.

It is an object of this invention to provide a novel pressure lubricating system suitable for use on the bogie wheels of military tanks.

Such tanks operate in the presence of large amounts of abrasives, that is, sand and dust, and if amphibious must operate also frequently in the water, and it is essential that no abrasive or water be admitted into the bearings of these wheels.

It is accordingly another object of my invention to provide a pressure lubrication system suitable for use in bogie wheels which will completely exclude all foreign substances from admission into the bearing structure of the wheel.

While attempts have been made to accomplish the foregoing object by applying pressure to a lubricant inside a wheel, the pressure thus applied has varied substantially with fluctuations in the atmospheric temperature. Unfortunately, the higher temperatures not only increase the pressure placed on the lubricant but increase the fluidity of the lubricant so as to result in undue loss of the latter in very hot weather.

Then, when relatively low temperatures are encountered or a rapid drop in temperature takes place as when plunging into water after travelling over desert land, a subatmospheric pressure can develop within the wheel which will suck dirt or mud into the wheel bearings. If this occurs the bogie wheel bearings wear out much earlier than they otherwise would, thus depriving our armed forces prematurely of the further use of those tanks which are equipped with these bearings.

It is a further object of my invention to provide a pressure lubricating system suitable for use in bogie wheels in which pressure applied to the lubricant is substantially unaffected by fluctuations in surrounding temperatures.

The manner of accomplishing the foregoing objects as well as other objects and advantages will be made manifest in the following description taken in connection with the accompanying drawings in which Fig. 1 is an elevational view of a bogie wheel with the central portion thereof in section to illustrate the structure and mode of operation of a preferred embodiment of the invention with which said wheel is equipped.

Figure 1:
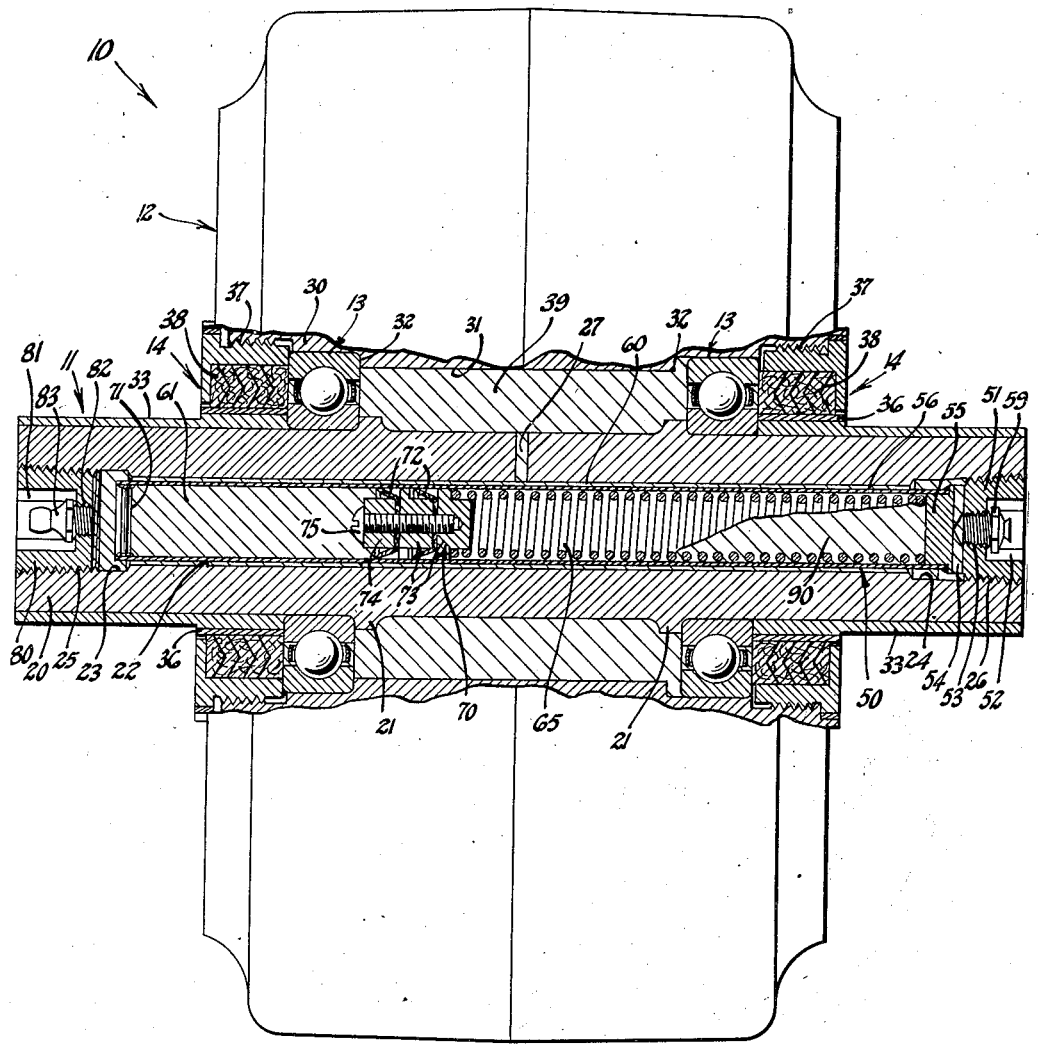

Referring specifically to the drawings, the bogie wheel 10 is shown therein as including an axle 11, an outer wheel structure 12, and a pair of bearings 13 by which the outer structure 12 is mounted on the axle 11.

Also disposed between the axle 11 and outer structure 12 are lubricant retaining seals 14.

Axle 11 comprises a piece of steel shafting 20 provided with annular bearing shoulders 21 and having a bore 22 formed axially therein throughout its length. Opposite ends of the bore 22 have counterbores 23 and 24 provided with tapered threads 25 and 26 respectively. Formed radially in the piece of shafting 20, midway between its ends and communicating between the bore 22 and the exterior surface of the shafting, is a hole 27.

The outer wheel structure 12 has a hub portion 30 having a central bore 31 at opposite ends of which are shoulders 32 which lie in planes spaced apart a slightly less distance than the bearing shoulders 21 on the shaft 20. The bearings 13 fit inwardly snugly against the shoulders 21 and are held in place by sleeves 33 which are pressed over the opposite end portions of the shaft 20 against the inner races of the bearings 13. The sleeves 33 have non-corrosive bushings 36 disposed adjacent to the bearings 13.

Threaded counterbores 37 are provided in opposite ends of the bore 31 and the seals 14 are screwed into these counterbores so that lubricated sealing rings 38 thereof come into snug sealing engagement with the outer surface of the bushings 36. One of the seals 14 is utilized to bind the outer race of the adjacent bearing 13 against the adjacent shoulder 32 of the wheel hub 30. This bearing thus takes up axial thrust shocks to which the wheel 10 is subjected.

The space between the bearings 13, within the bore 31 and outside the axle 11, constitutes a lubricant chamber 39.

Mounted in the bore 22 of the axle 11 is a lubricant pressure element 50. This element has a base plug 51 which screws into the threads 26. This plug has a central hexagonal opening 52 and a central threaded opening 53 which communicates with a hole 54 formed transversely therein, opposite ends of which open into the counterbore 24. The inner end of the plug 51 is turned down to form a cylinder head 55 which extends into and closes one end of a tubular cylinder 56, the latter being soldered, brazed or welded to the plug 51 to completely close that end of the cylinder 56.

When the element 50 is installed as shown in Fig. 1, the cylinder 56 thereof extends through the bore 22 as far as the counterbore 23 so as to give this cylinder the maximum practicable length. Screwed into the threaded hole 53 of the plug 51 is a pressure release valve 59 adapted to release lubricant from inside the bogie wheel 10 when pressure of this exceeds a given safety factor. It is here to be noted that the outside diameter of the cylinder 56 is less than that of the bore 22 so that free communication is maintained through the annular space 60 between the hole 27, the chamber 61 within the cylinder 56, and with the hole 54 and valve 59 in the plug 51.

Compressed within the cylinder chamber 61 is a coiled expansion spring 65. The spring 65 is normally much longer than the cylinder chamber 61 and is adapted to be compressed therein by application of a plunger 70 to the outer end of the spring. After the spring and plunger have thus been forced into the chamber 61, a pin 71 is fixed in the mouth of this chamber to prevent the plunger and spring from escaping.

The plunger 70 may be of any suitable construction but preferably includes a pair of flexible cup washers 72 which are trapped between flanged guide blocks 73 and a washer 74, all of which are held in assembled relation by a screw 75.

The counterbore 23 is closed by a plug 80 screwed into the threads 25, this plug having a hexagonal central opening 81 and a threaded hole 82 in which is screwed a Zerk check valve fitting 83.

Operation

When the bogie wheel 10 is assembled the chamber 39 and hole 27 are filled with grease and the plug 80 is screwed into place before the element 50 is installed. Before explaining how this is done it will be necessary to describe the mode of assembly of this element.

Figure 2:
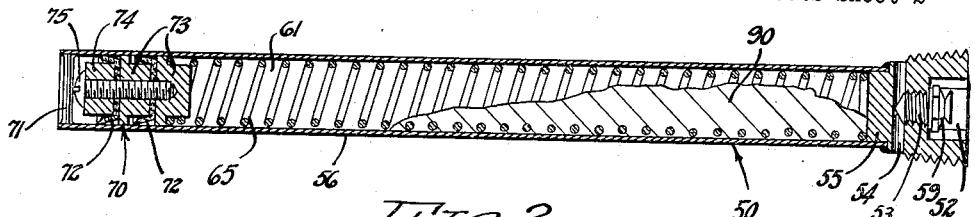
Fig. 2 is a longitudinal sectional view of the pressure cylinder of the invention at an intermediate stage of its assembly.

Prior to inserting the plunger 70 into the cylinder chamber 61, a quantity of grease 90 is placed in this chamber back of the plunger. This having been done, the spring 65 is compressed in the chamber 61, the plunger 70 inserted and the pin 71 secured in place to trap the spring and plunger as shown in Fig. 2.

Figure 3:
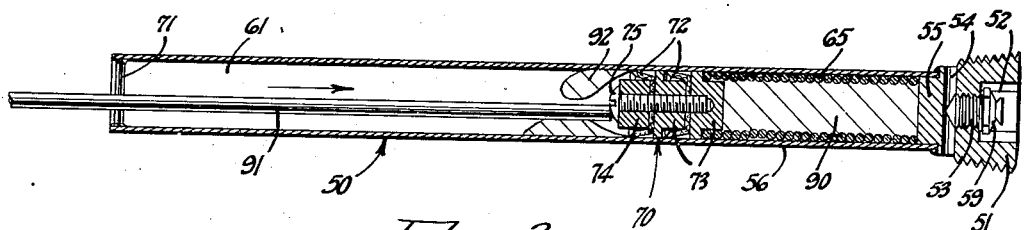
Fig. 3 is a view similar to Fig. 2 showing the next step in the assembly of said cylinder.

The unit 50 may then remain as thus shown until the time comes to install it in the bogie wheel 10. At that time the unit 50 may be cocked by the use of a rod 91 as shown in Fig. 3. This rod is extended into the chamber 61 past the stop pin 71 into engagement with the plunger 70 so as to force this plunger toward the cylinder head 55 at the closed end of the cylinder until the spring 65 is completely collapsed with its adjacent coils in contact with each other. The quantity of grease 90 disposed in the chamber 61 is sufficient so that before the spring 65 has been thus collapsed all the space between the plunger 70 and the cylinder head 55 is filled with this grease so that a quantity 92 of this grease overflows past the cup washers 73 of the plunger 70.

Figure 4:
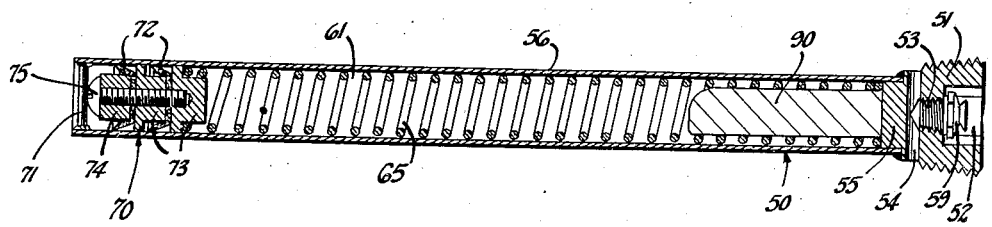
Fig. 4 is a view similar to Fig. 3 and illustrates the final step in the assembly of said cylinder.

When the spring 65 has thus been entirely collapsed so as to comprise a stop preventing further movement of the plunger 70 towards the cylinder head 55, the pressure is relaxed on the rod 91 permitting the spring 65 to expand and return the plunger 70 back to the position in which it engages the stop pin 71 as shown in Fig. 4. Except for the space occupied by the grease 90, the space between the plunger 70 and the head 55 in the cylinder chamber 61 is now completely evacuated of air. That is, it is occupied by a vacuum.

The element 50 is now ready to be inserted into the axle bore 22 and the plug 51 screwed snugly into the threads 56 as shown in Fig. 1. Before being thus inserted, a certain amount of grease is placed in the bore 22 so that when the plug 51 is in place all the space in the bore 22 surrounding the element 50 is filled with grease.

A grease gun is now applied to the Zerk fitting 83 and grease is pumped through this fitting into the counterbore 23 from which it passes into the cylinder chamber 61 and compresses the spring 65. This is continued until said spring is completely compressed as shown in Fig. 3. The force of injecting additional grease through the fitting 83 will thus transmit an excessive pressure to the safety valve 59 causing grease to flow outwardly therethrough. The fitting 83 thus prevents an excessive pressure being transmitted through the grease in the chamber 39 to the grease retaining seals 14.

When thus assembled and charged with grease, bogie wheel 10 is assembled on a military tank by suitable clamps on the frame of the tank being applied to the sleeved ends of the axle 11. During the operation of the tank and the bogie wheel 10, the latter will be lubricated by grease replenished by the operation of the spring 65 until the plunger 70 again comes to rest against the stop pin 71. Throughout this period there is no need for attention being given to the lubrication of this wheel as the grease will be supplied under substantially constant pressure to the bearings 13, this pressure being always in excess of the atmospheric pressure outside of the wheels 14. Thus a slight leakage of grease between the packing material 38 and the bushings 36 will take place but only sufficient to wash from the space between these elements any slight amount of abrasive which might be thrown against this portion of the wheel.

Furthermore it is to be noted that extremes of temperature to which the bogie wheel might be subjected during this period of its operation will in no wise alter the action of the spring 65 and the amount of pressure which it places on the lubricant within the wheel will at all times be substantially the same. This is because the spring 65 is completely sealed from the outside pressure and is surrounded by a vacuum.

The lubricant in the chamber 61 is of course replenished at intervals by recharging the wheel through fitting 83 in accordance with universally followed automotive lubricating practice. These intervals are fixed so that each wheel 10 is recharged with grease before the plunger 70 comes in contact with the stop pin 71. Thus grease is always fed to the bearings 13 under pressure from the spring 65.

It is to be noted that if grease should leak around the plunger 70 so that the element 50 will not receive its maximum charge of grease, the plunger 70 can be reset by removing the plug 80 and applying a rod to plunger 70 as shown in Fig. 3.

Figure 5:
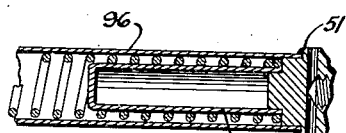
Fig. 5 is a longitudinal view illustrating a modified form of the invention.

In Fig. 5 I have illustrated an alternative form of the invention in which a core 95 is provided in the closed end of a cylinder 96 which may be substituted for the cylinder 56 of the element 50.

The function of the core 95 is to occupy most of the space within the spring 65 when this is compressed as shown in Fig. 3, thereby obviating the necessity of a relatively large quantity of grease 90 in the chamber 61 between the plunger 70 and the closed end of the cylinder.

What I claim is:

1. In a lubrication system for supplying lubricant to a lubricant chamber, the combination of: means forming a cylinder having an air-tight closed end, the open end of said cylinder being adapted to communicate with said chamber; a cup plunger disposed in said cylinder and adapted when lubricated to make an airtight fit therewith; and an expansion spring in said cylinder between the closed end thereof and said plunger, said spring having sufficient expansive strength when compressed to expand and force said plunger toward the open end of said cylinder against the pressure of the atmosphere.

2. In a lubrication system for supplying lubricant to a lubricant chamber, the combination of: means forming a cylinder having an air-tight closed end, the open end of said cylinder being adapted to communicate with said chamber; a cup plunger disposed in said cylinder and adapted when lubricated to make an airtight fit therewith; an expansion spring in said cylinder between the closed end thereof and said plunger, said spring having sufficient expansive strength when compressed to expand and force said plunger toward the open end of said cylinder against the pressure of the atmosphere; and stop means at the open end of said cylinder to retain said plunger therein against the expansive force of said spring.

3. In a lubrication system for supplying lubricant to a lubricant chamber, the combination of: means forming a cylinder having an air-tight closed end, the open end of said cylinder being adapted to communicate with said chamber; a cup plunger disposed in said cylinder and adapted when lubricated to make an airtight fit therewith; an expansion spring in said cylinder between the closed end thereof and said plunger, said spring having sufficient expansive strength when compressed to expand and force said plunger toward the open end of said cylinder against the pressure of the atmosphere; and a core of incompressible material disposed within said cylinder to substantially fill the space located within the coils of said spring and between said plunger and the closed end of said cylinder when said spring is fully compressed.

4. In a lubrication system for supplying lubricant to a lubricant chamber, the combination of: means forming a cylinder having an air-tight closed end, the open end of said cylinder being adapted to communicate with said chamber; a cup plunger disposed in said cylinder and adapted when lubricated to make an airtight fit therewith; an expansion spring in said cylinder between the closed end thereof and said plunger, said spring having sufficient expansive strength when compressed to expand and force said plunger toward the open end of said cylinder against the pressure of the atmosphere; and a quantity of grease disposed within said cylinder to substantially fill the space located within the coils of said spring and between said plunger and the closed end of said cylinder when said spring is fully compressed.

5. In combination: an axle adapted to rotatably support a wheel, said axle having an axial bore extending therethrough to form a lubricant chamber, and passage means to conduct lubricant from said chamber to a wheel carried by said axle; closures provided for opposite ends of said bore; a tube provided on one of said closures and fitting loosely in said chamber; a plunger in said tube; a spring in said tube between said plunger and the closure to which said tube is attached; a check valve; and an escape valve, one of said valves being provided upon each of said closures, there being passage means provided placing each of said valves in communication with the space outside said tube and within said bore.

6. In combination: an axle adapted to rotatably support a wheel, there being a bore extending axially through said axle to form a lubricant chamber, there being passage means provided in said axle to conduct lubricant from said chamber to a wheel carried by said axle, the opposite ends of said bore being internally threaded; screw plugs adapted to be received by said threaded bore ends; a tube provided on one of said plugs and adapted to be extended into said chamber when said plug is inserted in one end of said bore; a plunger in said tube; a spring in said tube between said plunger and the plug on which said tube is mounted; an intake check valve; and a pressure relief valve, one of said valves being mounted in each of said cups to communicate with space within said bore about said tube.

7. A combination as in claim 5 in which said closure on which said tube is mounted completely closes the end of said tube which is secured thereto thereby forming an air tight space between said closure and the plunger in said tube.

DAN R. RANKIN.